United States Patent

Choi

(10) Patent No.: US 9,464,599 B2
(45) Date of Patent: Oct. 11, 2016

(54) COOLING SYSTEM FOR DIESEL ENGINE HAVING TURBOCHARGER

(71) Applicant: Hyundai Motor Company, Seoul (KR)

(72) Inventor: Won Rok Choi, Seoul (KR)

(73) Assignee: Hyundai Motor Company, Seoul (KR)

(*) Notice: Subject to any disclaimer, the term of this patent is extended or adjusted under 35 U.S.C. 154(b) by 94 days.

(21) Appl. No.: 14/335,597

(22) Filed: Jul. 18, 2014

(65) Prior Publication Data

US 2015/0167595 A1    Jun. 18, 2015

(30) Foreign Application Priority Data

Dec. 16, 2013 (KR) .......................... 10-2013-0156696

(51) Int. Cl.
| | |
|---|---|
| F02B 33/44 | (2006.01) |
| F02B 29/04 | (2006.01) |
| F02B 33/00 | (2006.01) |
| F02M 25/07 | (2006.01) |

(52) U.S. Cl.
CPC ...... *F02M 25/0737* (2013.01); *F02B 29/0443* (2013.01); *F02B 29/0475* (2013.01); *F02M 26/04* (2016.02); *F02M 26/32* (2016.02); *Y02T 10/146* (2013.01)

(58) Field of Classification Search
CPC .............. F02M 25/0737; F02M 25/0706; F02B 29/0475; F02B 29/0443
USPC .............. 60/605.2, 599; 123/563, 568.12
See application file for complete search history.

(56) References Cited

U.S. PATENT DOCUMENTS

| | | | | |
|---|---|---|---|---|
| 4,787,443 | A * | 11/1988 | Fukatsu et al. ............... | 165/165 |
| 6,321,697 | B1 * | 11/2001 | Matsuda et al. ......... | 123/568.12 |
| 8,102,652 | B2 * | 1/2012 | Toh et al. ................ | 165/80.4 |
| 8,677,982 | B2 * | 3/2014 | Marimbordes ..... | F02B 29/0475 123/563 |
| 2006/0278377 | A1 * | 12/2006 | Martins ............... | F02B 29/0475 165/140 |
| 2007/0271910 | A1 * | 11/2007 | Chanfreau .......... | F02B 29/0418 60/320 |
| 2008/0087402 | A1 * | 4/2008 | Burk ................. | F02B 29/0443 165/101 |
| 2009/0139704 | A1 * | 6/2009 | Otoshi et al. ............ | 165/185 |
| 2009/0314266 | A1 * | 12/2009 | Hori et al. ........... | 123/568.12 |
| 2010/0077996 | A1 | 4/2010 | Pantow et al. | |
| 2010/0095939 | A1 * | 4/2010 | Geskes ............... | F02B 29/0475 123/568.12 |
| 2011/0185991 | A1 * | 8/2011 | Sheidler et al. ........ | 123/568.12 |

(Continued)

FOREIGN PATENT DOCUMENTS

| | | | | |
|---|---|---|---|---|
| DE | | 19853455 A1 * | 6/1999 | ............. F02M 25/07 |
| DE | 102004050778 A1 * | | 4/2006 | .......... F02B 29/0418 |

(Continued)

*Primary Examiner* — Thai Ba Trieu
(74) *Attorney, Agent, or Firm* — Morgan, Lewis & Bockius LLP

(57) ABSTRACT

A cooling system for a diesel engine having a turbocharger, may include an intercooler which cools compressed air from the turbocharger, an exhaust gas recirculation (EGR) cooler which cools EGR gas in an EGR device of the diesel engine, a low-temperature radiator fluidly-connected to the intercooler and the EGR cooler and supplying a coolant to the intercooler and the EGR cooler, and a water pump fluidly-connected to the low-temperature radiator, the intercooler and the EGR cooler and circulating the coolant of the low-temperature radiator, to the intercooler and the EGR cooler, wherein the intercooler and the EGR cooler may be disposed in series so that the coolant in the low-temperature radiator sequentially circulates through the water pump, the intercooler, the EGR cooler, and then the low-temperature radiator.

5 Claims, 7 Drawing Sheets

(56) References Cited

U.S. PATENT DOCUMENTS

| | | | |
|---|---|---|---|
| 2015/0159542 A1* | 6/2015 | Choi | F02B 29/0462 |
| 2015/0159592 A1* | 6/2015 | Choi | F02M 25/0726 |
| 2015/0159593 A1* | 6/2015 | Choi | F02M 25/0726 |
| 2015/0167594 A1* | 6/2015 | Jun | F02M 25/0737 60/605.2 |

FOREIGN PATENT DOCUMENTS

| | | | | |
|---|---|---|---|---|
| DE | 102011013029 A1 * | 9/2011 | | F02M 25/07 |
| FR | 2856746 A1 * | 12/2004 | | F02B 29/0412 |
| GB | 2438274 A * | 11/2007 | | F02M 25/07 |
| GB | 2444948 A * | 6/2008 | | F02B 29/04 |
| GB | 2455532 A * | 6/2009 | | F02M 25/07 |
| GB | 2507342 A * | 4/2014 | | F02M 25/07 |
| JP | 57-160957 U | 4/1981 | | |
| JP | 2009-270508 A | 11/2009 | | |
| JP | 2010-521619 A | 6/2010 | | |
| JP | 2011-190742 A | 9/2011 | | |
| JP | 2011-190744 A | 9/2011 | | |
| KR | 1020100004478 A | 1/2010 | | |
| WO | WO 2004044402 A1 * | 5/2004 | | F02M 25/07 |
| WO | WO 2007010301 A1 * | 1/2007 | | F02M 25/07 |

\* cited by examiner

COOLING SYSTEM FOR DIESEL ENGINE HAVING TURBOCHARGER

CROSS-REFERENCE TO RELATED APPLICATION

The present application claims priority to and the benefit of Korean Patent Application No. 10-2013-0156696 filed on Dec. 16, 2013, the entire contents of which is incorporated herein for all purposes by this reference.

BACKGROUND OF THE INVENTION

1. Field of the Invention

The present invention relates to a cooling system for a diesel engine having a turbocharger which improves output at a low-speed section using a turbocharger, and improves combustion efficiency and quality of exhaust gas.

2. Description of Related Art

In general, it is known that a diesel engine consumes less fuel and has excellent efficiency in comparison with a gasoline engine. Typically, the diesel engine exhibits efficiency of about 40%, which results from a high compression ratio of the diesel engine.

The recent diesel engine additionally has a turbocharger, an intercooler, and the like in order to obtain higher output.

The diesel engine to which the turbocharger is applied as described above sucks and compresses exhaust gas or external air using a compressor of the turbocharger, and supplies supercharged air (high-temperature compressed air), which is generated by the turbocharger, to an engine side.

However, the air, which is rapidly compressed, absorbs heat from the turbocharger and heat that is generated during a compression process, such that density of the air is decreased, and as a result, charging efficiency in a combustion chamber of the engine deteriorates.

Therefore, high density may be obtained by cooling the supercharged air using the intercooler, and as a result, a larger amount of air may be sucked in the combustion chamber of the engine, thereby obtaining high output.

Moreover, in order to reduce emissions of nitrogen oxide (NOx), which is one of the air pollutants, an exhaust gas recirculation (EGR) device is mounted in the diesel engine.

The nitrogen oxide is noxious gas that is generated when oxygen and nitrogen are combined under a high-pressure and high-temperature condition, and in order to suppress the nitrogen oxide, the exhaust gas recirculation (EGR) device supplies a part of exhaust gas, which is discharged into the atmosphere, to an intake system to lower a maximum combustion temperature, and reduces oxygen supply to reduce production of nitrogen oxide.

The EGR device needs to recirculate high-temperature exhaust gas, and thus has an EGR cooler for cooling the exhaust gas.

Because the existing EGR cooler typically uses an engine coolant, there are limitations in that a separate cooling line is required, and a position where the EGR cooler is mounted needs to be selected in consideration of a head height of the coolant.

Regarding the head of the coolant, in a case in which a height of the coolant at the EGR cooler side is great, bubbles may be produced in the EGR cooler, and as a result, noise problem may occur due to the bubbles at the time of starting an engine, and a coolant path is blocked by the bubbles such that cooling performance may deteriorate.

FIG. 7 is a schematic diagram of a cooling system for a diesel engine having a turbocharger according to the related art.

Referring to the FIG. 7, an inlet duct 900 is connected to one side of an intercooler 140, and an outlet duct 910 is connected to the other side of the intercooler 135.

Intake air passes the inlet duct 900, the intercooler 140, and the outlet duct 910 to be supplied to a combustion chamber of an engine. The intake air is cooled by outside air that passes the intercooler 140. While the intake air is cooled by the outside air, the cooling performance may be deteriorated.

The information disclosed in this Background of the Invention section is only for enhancement of understanding of the general background of the invention and should not be taken as an acknowledgement or any form of suggestion that this information forms the prior art already known to a person skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling system for a diesel engine having a turbocharger in which an intercooler and an EGR cooler are integrally combined to sequentially cool the intercooler and the EGR cooler using a coolant of a low-temperature radiator, thereby optimizing capacity of the EGR cooler, and increasing limited space where the EGR cooler is mounted.

In an aspect of the present invention, a cooling system for a diesel engine having a turbocharger, may include an intercooler which cools compressed air from the turbocharger, an exhaust gas recirculation (EGR) cooler which cools EGR gas in an EGR device of the diesel engine, a low-temperature radiator fluidly-connected to the intercooler and the EGR cooler and supplying a coolant to the intercooler and the EGR cooler, and a water pump fluidly-connected to the low-temperature radiator, the intercooler and the EGR cooler and circulating the coolant of the low-temperature radiator, to the intercooler and the EGR cooler, wherein the intercooler and the EGR cooler are disposed in series so that the coolant in the low-temperature radiator sequentially circulates through the water pump, the intercooler, the EGR cooler, and then the low-temperature radiator.

A coolant temperature in the intercooler is lower than a coolant temperature in the EGR cooler.

Dividing partition walls having flow paths are installed between the intercooler and the EGR cooler, and the intercooler and the EGR cooler are integrally coupled by the dividing partition walls.

A coolant inlet is formed at one side of the intercooler, and an outlet through which the coolant passing through the intercooler and the EGR cooler is discharged is formed at one side of the EGR cooler.

Inner partition walls having flow paths are installed in each of the intercooler and the EGR cooler.

The inner partition walls and the dividing partition walls may have a same shape.

A shape of the flow paths formed in the inner partition walls and the dividing partition walls is any one of a circular through hole, a vertically elongated through hole, and a horizontally elongated through hole.

According to the exemplary embodiment of the present invention, the intercooler and the EGR cooler are integrally combined to sequentially cool the intercooler and the EGR cooler using the coolant of the low-temperature radiator, thereby optimizing capacity of the EGR cooler, and increasing limited space where the EGR cooler is mounted.

That is, according to the exemplary embodiment of the present invention, with the coolant that flows from the low-temperature radiator, cooling performance of the EGR cooler may be improved, and a separate coolant path may be eliminated.

Moreover, according to the exemplary embodiment of the present invention, with the structure in which the intercooler and the EGR cooler are integrally combined, an effect of mixing fresh air and EGR gas may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
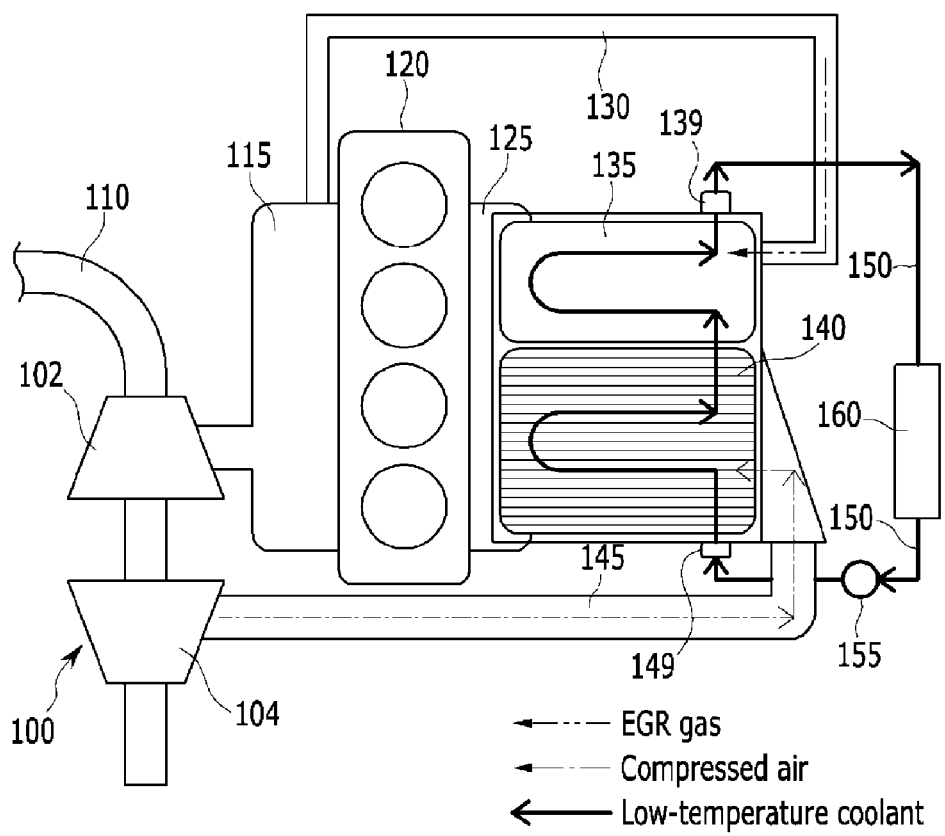
FIG. 1 is a schematic configuration diagram of a cooling system for a diesel engine having a turbocharger according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. However, the present invention is not limited to the exemplary embodiments described herein, and may be implemented in various different forms.

In addition, throughout the specification and the claims, unless explicitly described to the contrary, the word "comprise" and variations such as "comprises" or "comprising" will be understood to imply the inclusion of stated elements but not the exclusion of any other elements.

FIG. 1 is a configuration diagram schematically illustrating a cooling system for a diesel engine having a turbocharger according to an exemplary embodiment of the present invention.

A cooling system for a diesel engine having a turbocharger according to the exemplary embodiment of the present invention is a system in which an intercooler and an EGR cooler are integrally combined to sequentially cool the intercooler and the EGR cooler using a coolant of a low-temperature radiator.

The cooling system for a diesel engine having a turbocharger according to the exemplary embodiment of the present invention includes a turbocharger 100 which includes a turbine 102 and a compressor 104, an exhaust line 110, an exhaust manifold 115, a cylinder head 120, an intake manifold 125, an EGR line 130, an EGR cooler 135, an intercooler 140, a low-temperature coolant radiator 160, a low-temperature coolant line 150, a low-temperature coolant water pump 155, and an intake line 145.

Intake air is compressed by the compressor 104 of the turbocharger 100, and supplied to a combustion chamber of the cylinder head 120 through the intake line 145, the intercooler 140, and the intake manifold 125.

Further, combusted gas combusted in the combustion chamber is discharged to the outside through the exhaust manifold 115, the turbine 102 of the turbocharger 100, and the exhaust line 110. Compressed gas compressed by the compressor 104 is cooled by the intercooler 140.

The low-temperature coolant circulates through the low-temperature coolant line 150 that is provided separately from an engine coolant that circulates through the cylinder head 120, and the engine coolant circulates through an engine coolant line that is provided separately from the low-temperature coolant line 150.

The EGR cooler 135 is integrally coupled to the intercooler 140, and the EGR line 130 is formed from the exhaust manifold 115 to the EGR cooler 135.

Exhaust gas, which recirculates through the EGR line 130, is cooled by the EGR cooler 135, and mixed with the intake air in the intake manifold 125. In addition, both the EGR cooler 135 and the intercooler 140 are coupled to the intake manifold 125.

As illustrated in FIG. 1, the low-temperature coolant line 150 is formed along the low-temperature coolant water pump 155, the intercooler 140, the EGR cooler 135, and the low-temperature coolant radiator 160.

The low-temperature coolant, which flows through the low-temperature coolant line 150, cools the compressed gas in the intercooler 140, and sequentially cools EGR gas in the EGR cooler 135. Therefore, a coolant temperature in the intercooler 140 is lower than a coolant temperature in the EGR cooler 135.

The low-temperature coolant radiator 160 cools the heated low-temperature coolant, and the low-temperature coolant water pump 155 circulates the low-temperature coolant depending on a driving state in an electrically powered manner. Here, a rotation speed and a pumping load of the low-temperature coolant water pump 155 may be adjusted, and the low-temperature coolant water pump 155 may be turned off by a control unit even while the engine is operated.

In the exemplary embodiment of the present invention, the EGR cooler 135, the intercooler 140, and the intake manifold 125 are coupled such that a length of the low-temperature coolant line 150, which circulates the EGR cooler 135, the intercooler 140, and the intake manifold 125, may be reduced, cooling efficiency may be improved, the number of components may be decreased, and productivity may be improved.

Figure 2:
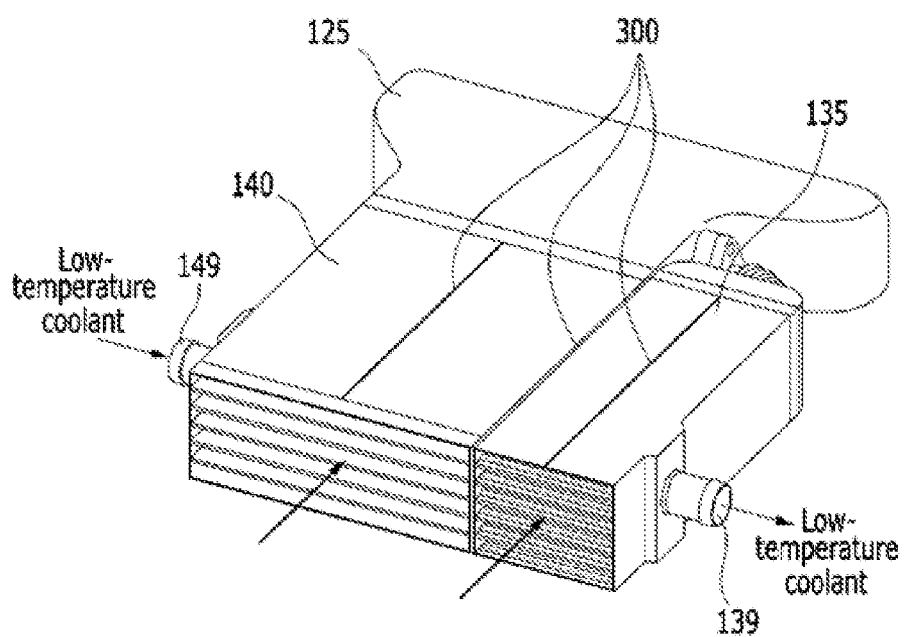
FIG. 2 is a partial perspective view of the cooling system for a diesel engine having a turbocharger according to the exemplary embodiment of the present invention.
Figure 3:
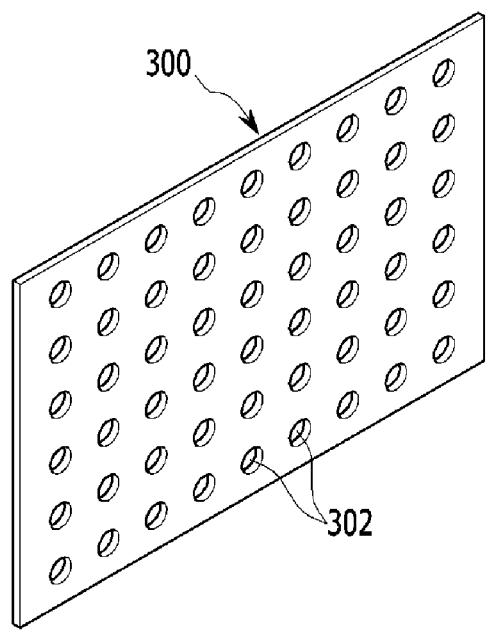
FIGS. 3 to 5 are configuration diagrams of partition walls that are applied to the cooling system for a diesel engine having a turbocharger according to the exemplary embodiment of the present invention.
Figure 4:
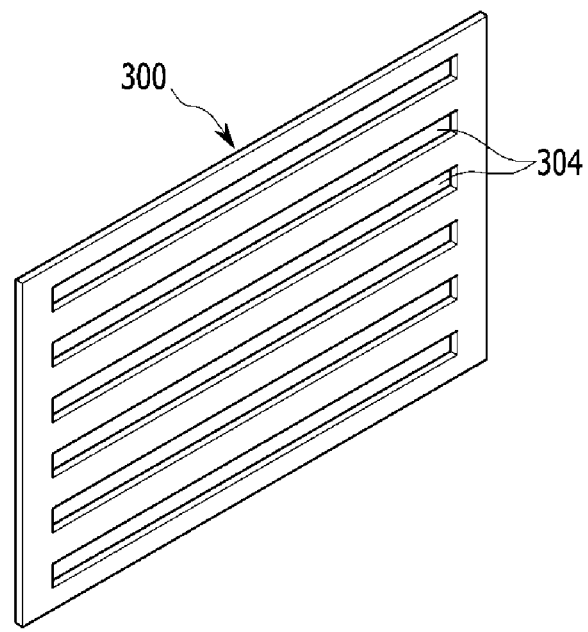
Figure 5:
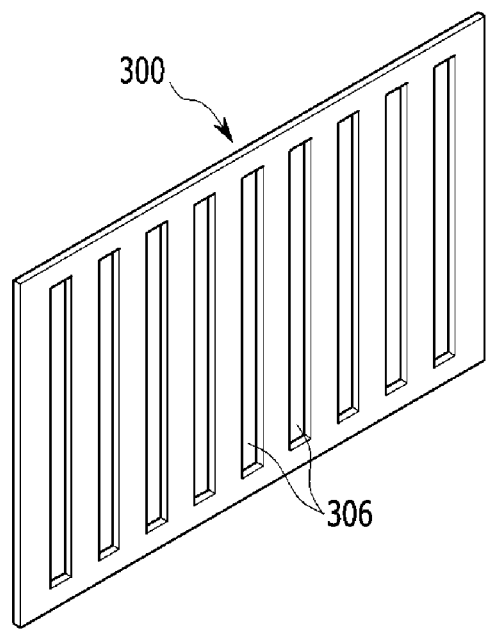
Figure 6:
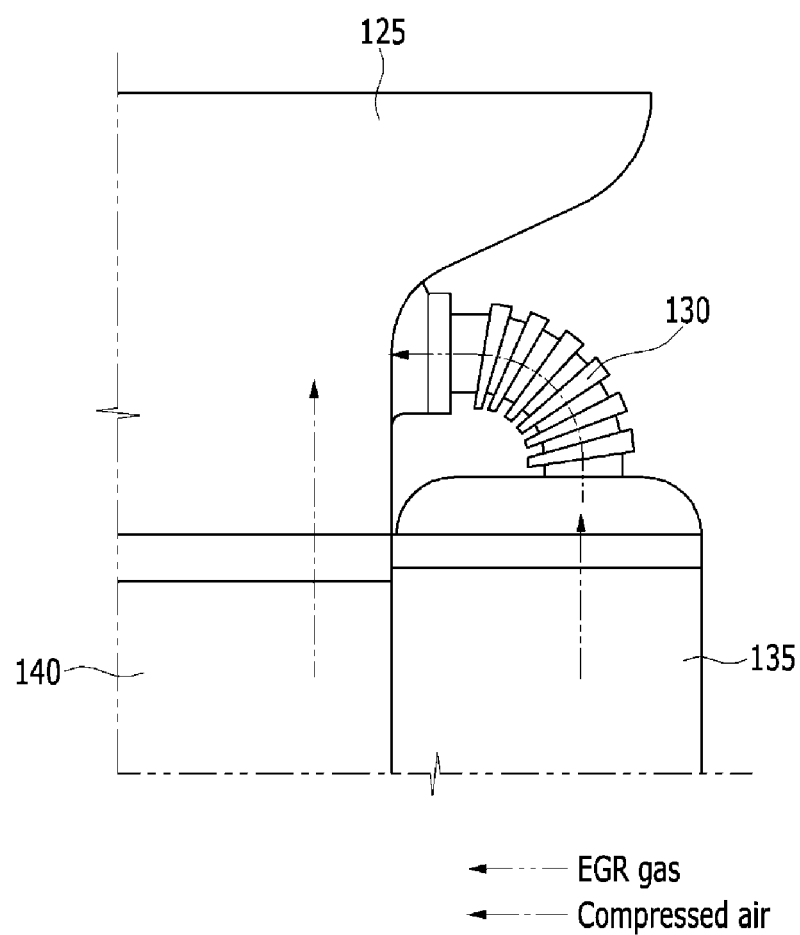
FIG. 6 is a partial top plan view of the cooling system for a diesel engine having a turbocharger according to the exemplary embodiment of the present invention.
Figure 7:
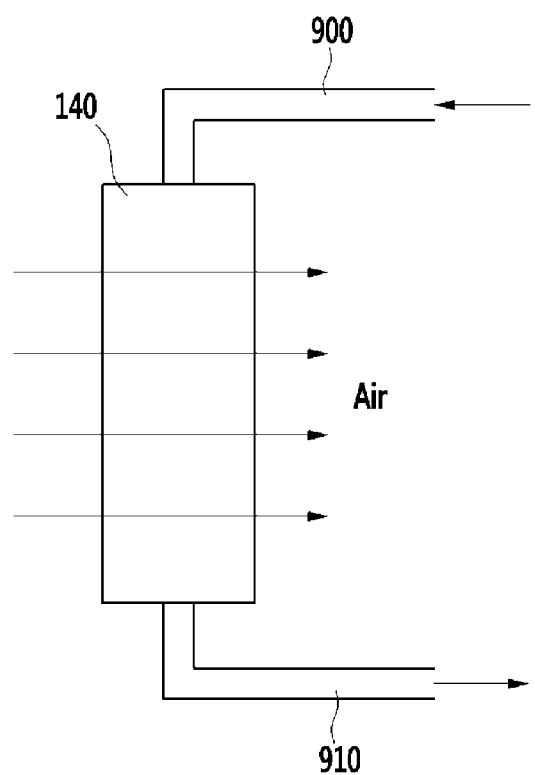
FIG. 7 is a schematic diagram of a cooling system for a diesel engine having a turbocharger according to the related art.

FIG. 2 is a partial perspective view of the cooling system for a diesel engine having a turbocharger according to the exemplary embodiment of the present invention, FIGS. 3 to 5 are various configuration diagrams of partition walls that are applied to the cooling system for a diesel engine having a turbocharger according to the exemplary embodiment of the present invention, and FIG. 6 is a partial top plan view of the cooling system for a diesel engine having a turbocharger according to the exemplary embodiment of the present invention.

Referring to FIG. 3, the intercooler 140 and the EGR cooler 135 are coupled integrally with each other through partition walls 300, and directly connected to the intake manifold 125.

The intercooler 140 and the EGR cooler 135 may be integrally combined by the existing bolting, riveting, welding, or a fastening method that corresponds to the bolting, riveting, or welding.

Dividing partition walls 300, which have flow paths 302, 304, and 306 as illustrated in FIGS. 3 to 5, are installed between the intercooler 140 and the EGR cooler 135, and the intercooler 140 and the EGR cooler 135 may be integrally coupled by the dividing partition walls 300 using the aforementioned fastening method.

As such, the intercooler 140 and the EGR cooler 135 are integrally combined with the partition walls 300 interposed therebetween, such that a coolant inlet 149 is formed at one side of the intercooler 140, and an outlet 139 through which the coolant passing through the intercooler 140 and the EGR cooler 135 is discharged is formed at one side of the EGR cooler 135.

In order to allow the coolant to smoothly flow, and suppress slopping of the coolant, inner partition walls 300, which have flow paths 302, 304, and 306, are installed even in each of the intercooler 140 and the EGR cooler 135, as illustrated in FIGS. 3 to 5. The inner partition wall may have the same shape as the dividing partition wall.

The flow paths, which are formed in the inner partition walls and the dividing partition walls, may be formed to have various shapes in consideration of smooth flow of the coolant and/or design, and for example, as the flow paths, a plurality of circular through holes 302 may be formed as illustrated in FIG. 3, a plurality of horizontally elongated through holes 304 may be formed as illustrated in FIG. 4, or a plurality of vertically elongated through holes 306 may be formed as illustrated in FIG. 5, but it should not be understood that the protective scope of the present invention is limited thereto. As long as other shapes are applied, but the shapes substantially allow the coolant to smoothly flow, the technical spirit of the present invention may be applied even to, for example, through holes having comb patterns.

The intake air, which is discharged from the intercooler 140, is directly supplied to the intake manifold 125, and the intake air, which is discharged from the EGR cooler 135, is directly supplied to the intake manifold 125. Further, the intake air and the EGR gas are mixed in the intake manifold 125, and supplied to the combustion chamber.

That is, referring to FIG. 6, the compressed air passing through the intercooler 140 and the EGR gas passing through the EGR cooler 135 and the EGR line 130 are mixed in the intake manifold 125, and supplied to the combustion chamber.

Accordingly, according to the exemplary embodiment of the present invention, the intercooler and the EGR cooler are integrally combined to sequentially cool the intercooler and the EGR cooler using the coolant of the low-temperature radiator, thereby optimizing capacity of the EGR cooler, and increasing limited space where the EGR cooler is mounted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A cooling system for a diesel engine having a turbocharger, comprising:
    an intercooler cooling compressed air from the turbocharger;
    an exhaust gas recirculation (EGR) cooler cooling EGR gas in an EGR device of the diesel engine;
    a low-temperature radiator fluidly-connected to the intercooler and the EGR cooler and supplying a coolant to the intercooler and the EGR cooler; and
    a water pump fluidly-connected to the low-temperature radiator, the intercooler and the EGR cooler and circulating the coolant of the low-temperature radiator, to the intercooler and the EGR cooler,
    wherein both of the intercooler and the EGR cooler are directly coupled to an intake manifold, and disposed in series so that the coolant in the low-temperature radiator sequentially circulates through the water pump, the intercooler, the EGR cooler, and then the low-temperature radiator,
    wherein dividing partition walls having flow paths in a body of each dividing partition wall are installed between the intercooler and the EGR cooler, and the intercooler and the EGR cooler are integrally coupled by the dividing partition walls, and
    wherein a coolant inlet is formed at one side of the intercooler, and an outlet through which the coolant passing through the intercooler and the EGR cooler through the flow paths of the dividing partition walls is discharged is formed at one side of the EGR cooler.

2. The cooling system of claim 1, wherein a coolant temperature in the intercooler is lower than a coolant temperature in the EGR cooler.

3. The cooling system of claim 1, wherein inner partition walls having flow paths are installed in each of the intercooler and the EGR cooler.

4. The cooling system of claim 3, wherein the inner partition walls and the dividing partition walls have a same shape.

5. The cooling system of claim 1, wherein a shape of the flow paths formed in the inner partition walls and the dividing partition walls is any one of a circular through hole, a vertically elongated through hole, and a horizontally elongated through hole.

* * * * *